United States Patent
Gebauer et al.

(10) Patent No.: US 11,143,636 B2
(45) Date of Patent: Oct. 12, 2021

(54) FLUID DISTRIBUTOR UNIT

(75) Inventors: Klaus Gebauer, Uppsala (SE); Jan Kranse, Ostervala (SE); Mats Lundkvist, Uppsala (SE)

(73) Assignee: Cytiva Sweden AB, Uppsala (SE)

( * ) Notice: Subject to any disclaimer, the term of this patent is extended or adjusted under 35 U.S.C. 154(b) by 783 days.

(21) Appl. No.: 13/322,930

(22) PCT Filed: May 24, 2010

(86) PCT No.: PCT/SE2010/050559
§ 371 (c)(1),
(2), (4) Date: Nov. 29, 2011

(87) PCT Pub. No.: WO2010/138061
PCT Pub. Date: Dec. 2, 2010

(65) Prior Publication Data
US 2012/0074051 A1    Mar. 29, 2012

(30) Foreign Application Priority Data
May 29, 2009  (SE) .................................. 0950386-3

(51) Int. Cl.
| | | |
|---|---|---|
| *G01N 30/60* | (2006.01) | |
| *B01D 15/14* | (2006.01) | |
| *B33Y 80/00* | (2015.01) | |
| *B33Y 30/00* | (2015.01) | |

(52) U.S. Cl.
CPC ......... *G01N 30/6017* (2013.01); *B01D 15/14* (2013.01); *B33Y 30/00* (2014.12); *B33Y 80/00* (2014.12); *Y10T 29/494* (2015.01); *Y10T 137/87265* (2015.04)

(58) Field of Classification Search
CPC .............. G01N 30/6017; G01N 30/02; G01N 30/6004; G01N 30/603; B01D 15/10; B01D 15/14; B01D 15/18
See application file for complete search history.

(56) References Cited

U.S. PATENT DOCUMENTS

| | | | | |
|---|---|---|---|---|
| 4,676,898 A | * | 6/1987 | Saxena .................. | B01D 15/14 210/198.2 |
| 5,938,333 A | | 8/1999 | Kearney | |
| 6,333,019 B1 | | 12/2001 | Coppens | |
| 6,610,200 B1 | * | 8/2003 | Leijon et al. .............. | 210/198.2 |

(Continued)

FOREIGN PATENT DOCUMENTS

WO   WO 1998/054568    12/1998

OTHER PUBLICATIONS

Wilf, M. Membrane Types and Factors Affecting Membrane Performance. Advanced Membrane Technologies Stanford University. May 7, 2008.*

(Continued)

*Primary Examiner* — Katherine Zalasky McDonald
(74) *Attorney, Agent, or Firm* — Eversheds Sutherland (US) LLP

(57) ABSTRACT

A fluid distributor unit comprising a channel system where one or more inlet channels (2) starting on an inlet side (3) of the distributor unit branch out successively into several channels (6) ending on the other side of the distributor unit, called the outlet side (4), characterised in that said distributor unit is provided in one single body (1) by free form fabrication.

11 Claims, 6 Drawing Sheets

(56) References Cited

U.S. PATENT DOCUMENTS

| | | | |
|---|---|---|---|
| 6,733,730 | B1 | 5/2004 | Griffiths et al. |
| 6,905,595 | B2 * | 6/2005 | Gebauer .................... 210/198.2 |
| 2002/0196706 | A1 | 12/2002 | Kearney |

OTHER PUBLICATIONS

Taylor, J., Carrano, A., Kandlikar, S . Characterization of the effect of surface roughness and texture on fluid flow. Elsevier. 2006.*
BioPharm International. Evaluation of Extractable from Product-Contact Surfaces. Process Development. Dec. 2002.*
Guiochon, G., Journal of Chromatography A, 1168 (2007) 101-168.
Luo, L., et al., Applied Thermal Engineering, 27 (2007) 1708-1714.
Tondeur, D., et al., Chemical Engineering Science, 59 (2004) 1799-1813.
Third Party Submission under 37 C.F.R. 1.290 submitted on Sep. 1, 2020 in U.S. Appl. No. 16/708,291 (28 pages).
COSMOSFloWorks; CFD (Computational Fluid Dynamics) for Flow Analysis and Simulation, 1 page Copyrighted Webpage in 2007) https://web.archive.org/web/20071011001244/http://www.solidworks.com/pages/products/cosmos/cosmosfloworks.html.
Kearney, "Process Intensification Using Engineered Fluid Transporting Fractals", 7 pages, Presented at the Apr. 2003 AlChE Spring National Meeting.
West et al., "Practical experience of juice decalcification using a weak acid cation exchange resin plant incorporating fractal fluid distribution" 7 pages, paper presented at the 1st ESST Conference on May 18-20, 2009 in Rotterdam, The Netherlands, Zuckerindustrie (Sugar Industry) 134 (9):579-585, Sep. 2009.
SolidWorks: 3D Mechanical Design Software; 1 page, Copyrighted Webpage in 2007) https://web.archive.org/web/20070708053405/http://www.solidworks.com/pages/products/3dmech.html.
CFD Fluent Brochure (2004); 12 pages, (Brochure copyrighted in 2004).

* cited by examiner

FLUID DISTRIBUTOR UNIT

CROSS-REFERENCE TO RELATED APPLICATIONS

This application is a filing under 35 U.S.C. § 371 and claims priority to international patent application number PCT/SE2010/050559 filed May 24, 2010, published on Dec. 2, 2010 as WO 2010/138061, which claims priority to application number 0950386-3 filed in Sweden on May 29, 2009.

FIELD OF THE INVENTION

The present invention relates to a distributor unit for uniformly distributing a fluid flow onto a porous bed in a column. In particular it relates to a sanitary distributor unit for use in the processing of biomacromolecules. Furthermore the present invention relates to a method to prepare said distributor unit.

BACKGROUND OF THE INVENTION

In the processing of biomacromolecules for pharmaceutical use such as proteins, peptides, nucleic acids, vaccine antigens etc it is common to use packed columns for purification (chromatography) and/or synthesis (solid phase synthesis of e.g. peptides or oligonucleotides).

In these columns, the fluid distribution system is of paramount importance to the overall performance, particularly for columns with large cross-sections in relation to bed height. Since the products are to be used in pharmaceuticals, it is also critical that the fluid distribution systems can be efficiently sanitised to avoid any risk of product contamination.

Columns for liquid chromatography or solid phase synthesis normally comprise a vessel filled with a porous bed through which a liquid flows, with separation in the chromatography case taking place by material distribution between the liquid and the solid phase of the porous bed. The porous bed is commonly a packed bed, typically formed by consolidating a suspension of discrete particles, but it can also be a monolithic porous body or a stack of porous sheets (membranes). The column often has a cylindrical geometry, with flow passing axially from one end to the other, but columns with radial flow are also well known and non-cylindrical geometries have been described. In all these constructions, the liquid flow must be well distributed from a feed tube over the entire bed surface. As the scaling parameter of columns is usually the column diameter, with the bed height kept constant, the difficulty of distribution is considerably higher for large-scale columns with correspondingly low height-to-diameter ratios.

A uniform flow distribution is essential in order to obtain good efficiency for a chromatography column Uniform flow distribution is a prerequisite for achieving uniform residence time for all fluid elements passing the packed bed and column, respectively. Any deviations from uniformity will show up as premature breakthrough, low plate numbers or peak asymmetry as they generate an unfavourable broadening in the residence time distribution over the column. Two features of a distribution system are essential for achieving uniform flow distribution: The first feature is the ability of the distribution system to transfer fluid from essentially a single tubing feeding liquid to the column onto the surface of the packed bed such that all fluid elements are applied simultaneously over the packed bed surface. The same simultaneous withdrawal and collection of fluid applies to the removal of fluid at the column outlet. The second critical feature is the ability to maintain uniform pressure across the surface of the packed bed which is yielding a uniform fluid velocity over the bed and the column. Distribution systems of prior art typically suffer from the fact that neither of mentioned features can be achieved. A compromise has to be found which is least unfavourable with regard to chromatographic operation and packed bed dimensions. Hereby, the scalability of a given distribution system is limited as the dimensions of the distribution system have to be optimised for a narrow range of packed bed properties as well as a limited range of fluid flow and pressure. In the solid phase synthesis case, similar constraints apply in the quest for high product yield/purity and for efficient utilisation of expensive reagents.

A classical fluid distribution system for axial columns simply consists of a central inlet for the mobile phase in combination with a thin distribution channel (gap) behind a filter (woven net or sinter) confining the inlet end of the bed. This type of system will by necessity deteriorate strongly in performance with increasing diameter of the column. This is due to the residence time difference between fluid elements travelling from the inlet to the outer column wall and those fluid elements which directly can enter the net and the bed region below the inlet port. Further, the required fluid transfer of liquid throughout the distribution channel towards the column wall will result in a pressure drop across the distribution channel. As a result, the pressure drop over the packed bed and thus the uniformity of the fluid velocity field will be affected.

Classical distribution systems as described above are typically relying on a lateral liquid distribution over the packed bed by means of said distribution channel. A problem with this technique is that the distribution channel preferably should be open and hereby allowing for unrestricted lateral fluid flow avoiding pressure loss by means of lateral fluid transfer. However, for reasons of structural stability it is required to incorporate a support structure in between the end piece of the column and the particle retaining filter, which is often represented by a coarse woven mesh or patterns of support ribs machined into the column end piece. A disadvantage with this necessary support structure in the distribution channel is that it occupies space and causes pressure loss by increased tortuosity or wall friction in the distribution channel. If the support structure is omitted, the filter material may bulge during use, causing non-uniform distribution as the distribution channel and thus the lateral fluid distribution is compromised.

Another well-known technique for distribution is the plate system, typically utilising a plate with face openings along radii (and optionally circumferences) on the plate to achieve fluid distribution by decreasing the resistance of fluid flow through the plate with increasing radius. This type of construction relies on pressure loss through orifices caused by turbulence. This underlying principle requires operation at a single fluid velocity to ensure the functionality, leading to a poor control of the pressure drop and hence a poor distribution when operating over a broader range of fluid velocities over the packed bed and column as typically required in chromatography.

A third technique is disclosed in U.S. Pat. No. 4,537,217, which is comprised of a layered distribution structure, comprising a first layer that acts as a cover and in which a fluid inlet is formed, a second layer wherein a number of channels are formed which each terminates in an outlet extending through the second layer. The outlets form a well-distributed pattern, which provides a high degree of fluid distribution on the packing side of the distribution system. Although this system provides distribution, it suffers from several disadvantages, particularly in that it is difficult to produce especially for a large number of channels at large column diameters. There is further a risk for sanitary problems due to the troublesome cleaning of channels with a large number of sharp 90 degree corners, and in that it is impossible to prevent fluid from entering in between the layers.

As a further development of the last technique, U.S. Pat. No. 5,354,460 discloses the use of a large number of fan shaped "step-down-nozzles", similar to the layered distribution structure presented above, that are arranged in concentric rings and interconnected by a manifold system. Due to the modular construction this system may be produced using large-scale production techniques, but the high degree of complexity still results in high production costs. Like the layered distribution structure, complex assembled systems of this type are extremely difficult to clean; whereby there is an obvious risk for sanitary problems.

U.S. Pat. No. 6,905,595 discloses a distributor with a simpler rotationally symmetric construction, but it is still difficult to manufacture due to the joining of several plates and comprises channels with sharp corners and 90-degree bends that cause undesired turbulence and difficulties in sanitation.

WO99/48599 contemplates the use of casting techniques to prepare a fractal distribution plate as a unitary structure, but the structures indicated are all of the classical sharp-cornered 90 degree bend type discussed in the above references.

Common features of all the distributor units described above are also a) that they are used with a filter (woven net or sinter) between the distributor unit and the bed, b) that a structural support is required to be fitted in the distribution channel to provide mechanical support in between the end piece and the filter and c) that they are fitted with elastomeric sealing means (O-rings and the like) to seal against the column tube walls. The joints between the distributor unit and these auxiliary constructions are likely to contribute to sanitation difficulties.

D Tondeur and L Luo (Chem Eng Sci 59, 1799-1813 2004) describe a fractal distributor for an activated carbon monolith, prepared by stereolithography. The design is however again of the sharp-cornered 90 degree bend type discussed above and is not suitable for applications where a sanitary design is needed.

There is thus a need for a distributor unit with a well-designed channel tree structure that allows for good distribution without joints, sharp bends and corners that create turbulence and problems in sanitation. There is also a need for a manufacturing technique to prepare this distributor unit.

SUMMARY OF THE INVENTION

One aspect of the invention is to provide a uniformly distributed flow of one or more feeds onto a chromatography or solid phase synthesis column for processing of biomacromolecules. This is achieved with a fluid distributor unit as defined in claim 1.

One advantage with such a fluid distributor unit is that it provides excellent distribution characteristics.

Another advantage is that the proposed liquid distribution unit reduces the risk for sanitation problems due to the one-piece design with no interconnections/joints and the possibility to avoid sharp corners and 90 degree bends.

Yet another advantage is that the proposed liquid distribution unit makes possible a true "design by calculation" and therefore an a priori optimization of all its dimensions to achieve optimal performance and scalability.

Further suitable embodiments of the invention are described in the depending claims.

BRIEF DESCRIPTION OF THE DRAWINGS

FIG. 8a) linear decrease of diameter, FIG. 8b) linear increase of diameter, FIG. 8c) nonlinear decrease of diameter, FIG. 8d) nonlinear increase of diameter, FIG. 8e) linear constriction, FIG. 8f) nonlinear constriction.

DETAILED DESCRIPTION OF THE INVENTION

Figure 1:
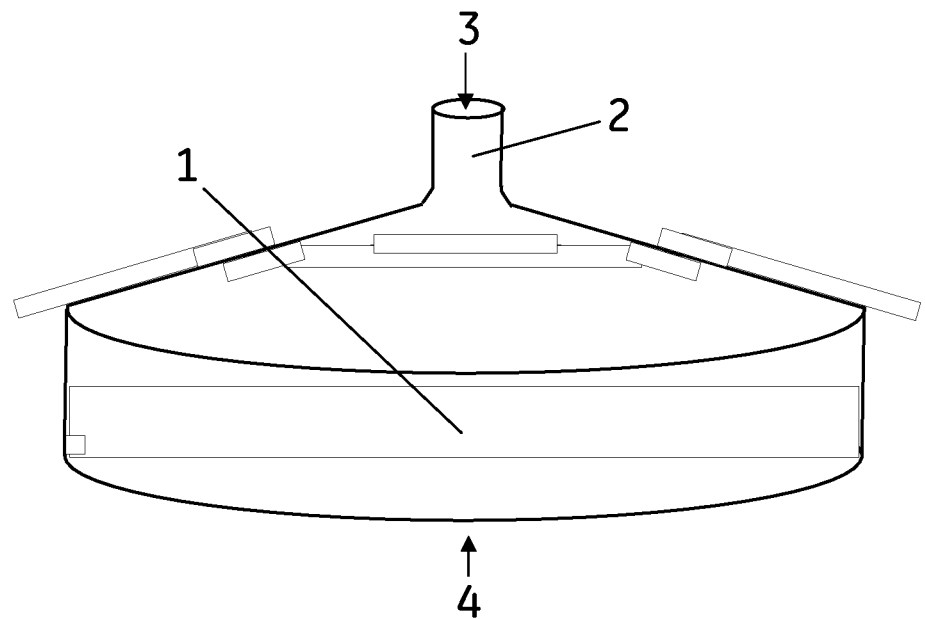
FIG. 1 is an outside view of the distributor unit according to one embodiment of the invention.
Figure 2:
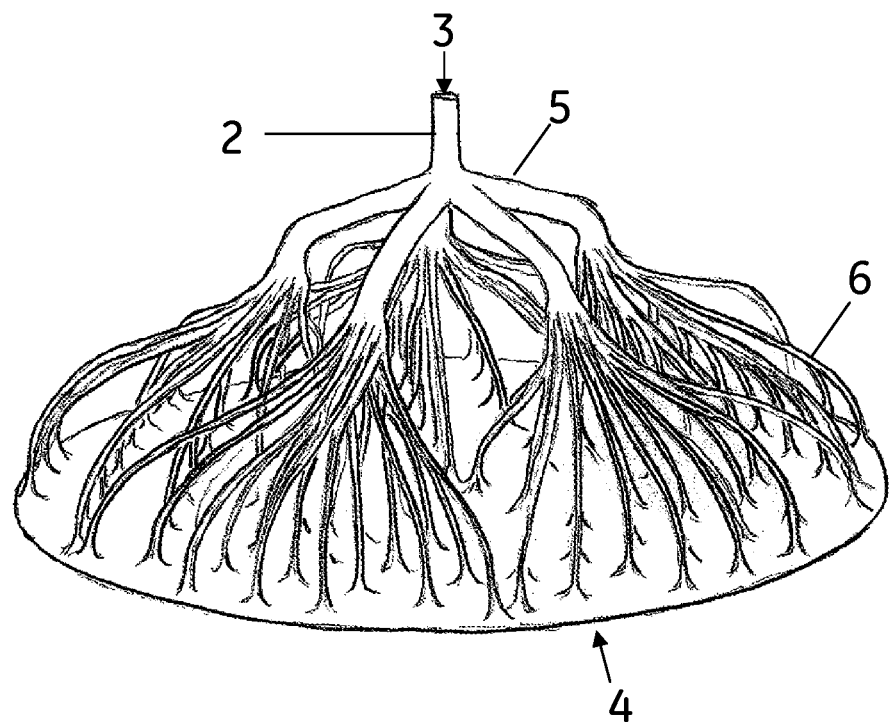
FIG. 2 is a negative contrast schematic view of the channel system in the distributor unit according to one embodiment of the invention.
Figure 3:
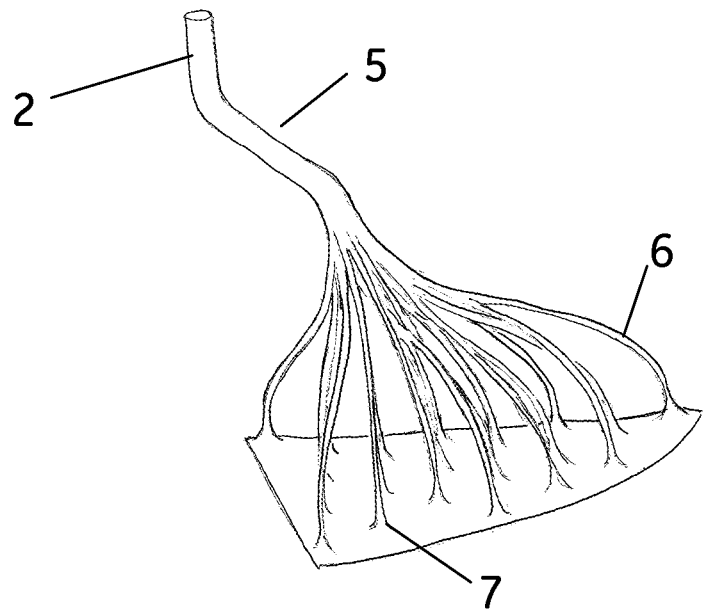
FIG. 3 is a close-up view of a part of the channel system in FIG. 2.
Figure 4:
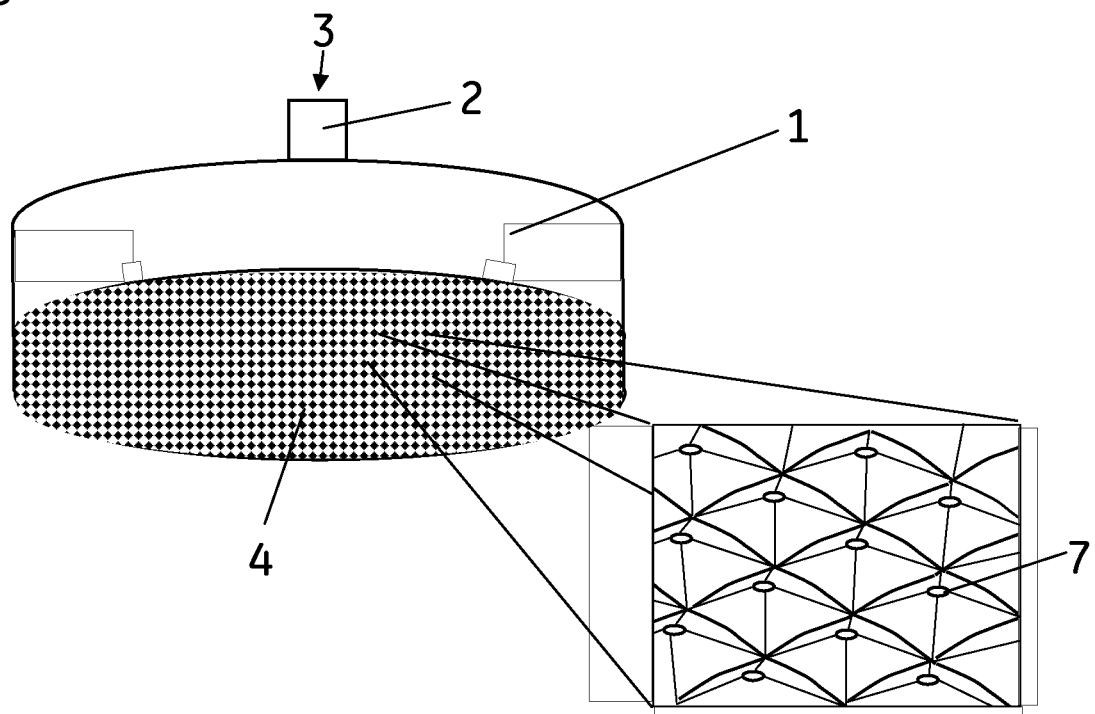
FIG. 4 is an outside view of the distributor unit according to another embodiment of the invention, with conical diffusors at the outlet side.
Figure 5:
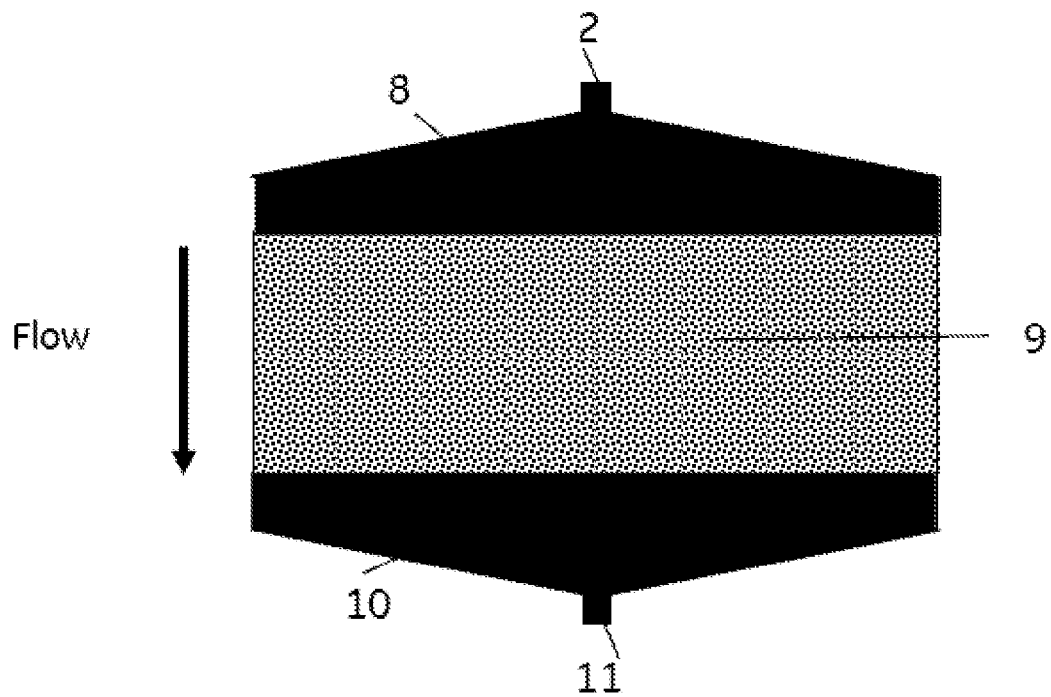
FIG. 5 is a schematic view of an axial flow column according to one embodiment of the invention, with the flow going downwards.
Figure 6:
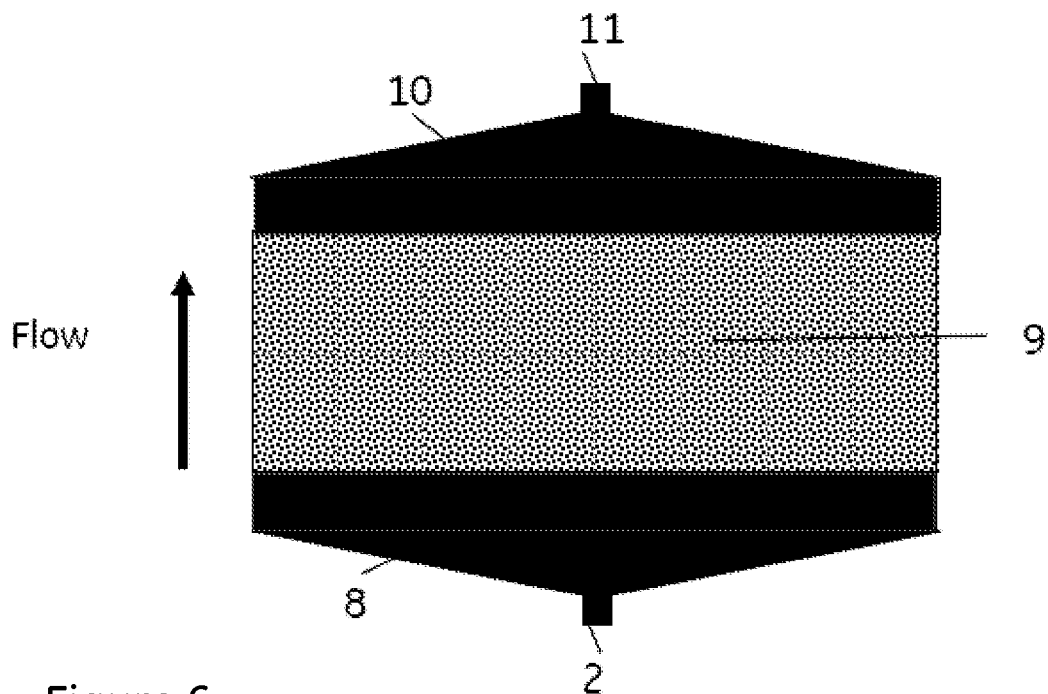
FIG. 6 is a schematic view of an axial flow column, with the flow going upwards.
Figure 7:
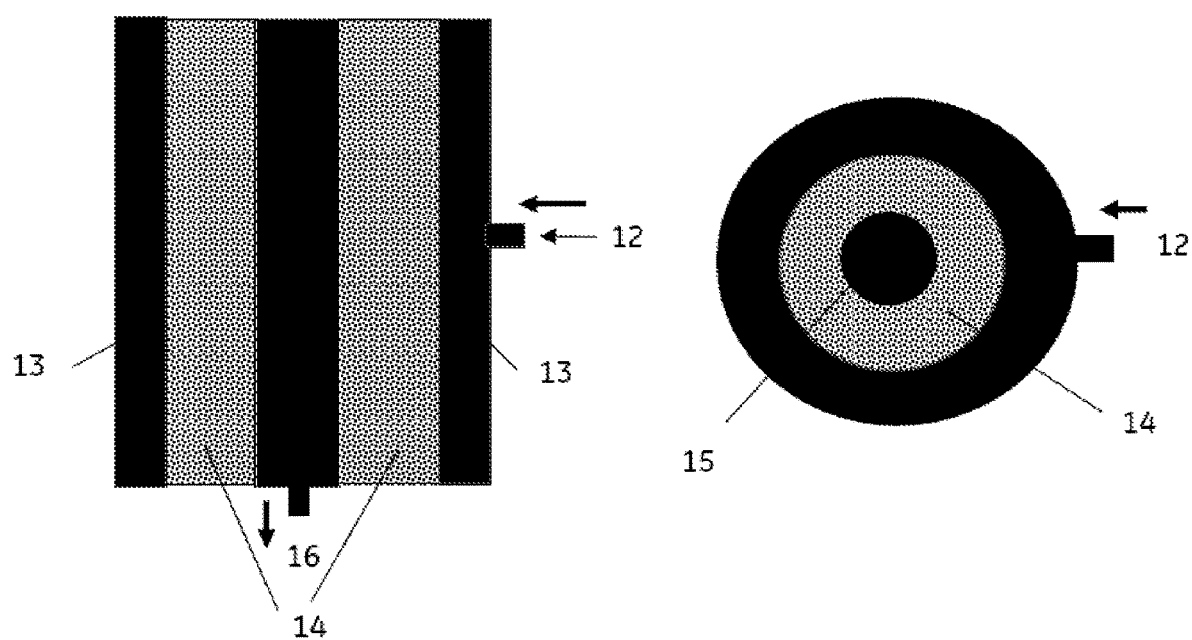
FIG. 7 is a schematic view of a radial flow column arrangement according to one embodiment of the invention.
Figure 8:
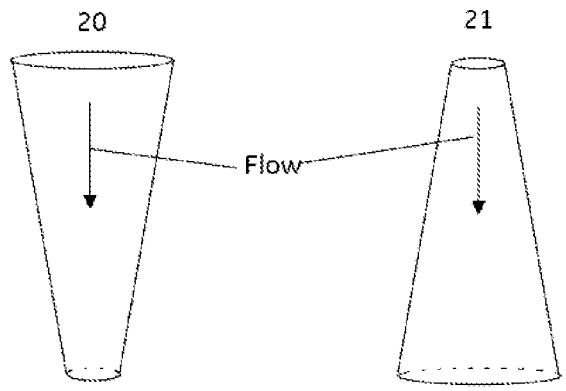
FIG. 8 is a series of schematic views of channel segments having variable diameter according to certain embodiments of the invention.
Figure 8:
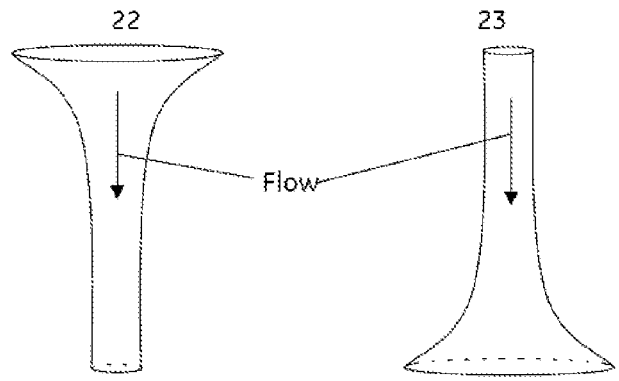
Figure 8:
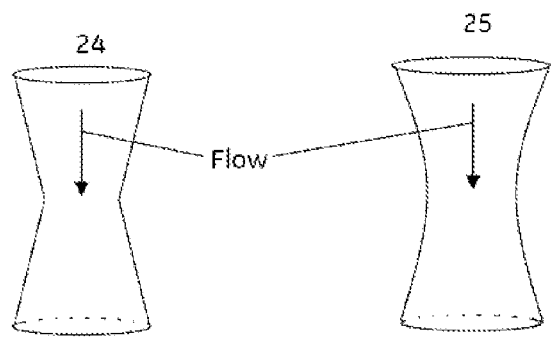

In one aspect, the present invention discloses a sanitary fluid distributor unit 1 as depicted in FIGS. 1-3, comprising a channel system where one or more inlet channels 2 starting on an inlet side 3 of the distributor unit branch out successively into several channels 6 ending on the other side of the distributor unit, called the outlet side 4. According to the invention, the distributor unit is provided in one single body by free form fabrication. The distributor unit is intended to be used e.g. in a chromatography or solid phase synthesis column so that the feed enters the inlet channel(s) 2 and is distributed by the channel tree over the entire inlet surface of a column bed 9 (see FIG. 5). It will then migrate as a well defined liquid phase plug through the bed to the outlet surface, where it will enter a collector unit 10 (FIG. 5)—which can be an inversed distributor unit according to the present invention—collecting the plug from the entire bed outlet surface and concentrating it via a channel tree to a column outlet 11. In a vertical axial column where the distributor unit is typically plate-shaped, as depicted in FIGS. 5 and 6, the flow may go either upwards or downwards, so that on flow reversal the distributor unit 8 will become the collector unit 10 and vice versa. In a radial column arrangement (FIG. 7), the flow will from the inlet side 12 enter a tubular distributor unit 13, surrounding the perimeter of the column with a branched channel system, such that the fluid is distributed over the entire outside surface of the tubular bed 14. It will then pass as a plug radially inwards through the bed and be collected via a cylindrical collector unit 15 to an outlet 16. The tubular distributor unit 13, the branched channel system, the tubular bed 14, and the cylindrical collector unit 15 are disposed concentrically with each other as shown in FIG. 7.

In a specific embodiment, part of the channel volume is not accessible by a straight line of sight from any channel openings on either side of the distributor unit. We have discovered that a channel system with smoothly curved channels is to be preferred over the traditional right-angle arrangement. This gives better distribution of the fluid, lower pressure drops and facilitates the sanitation of the unit. Suitably, the angle of curvature will vary over different parts of the channel system and optionally the maximum angle of curvature (with angle of curvature defined as the acute angle between two tangents to a channel before and after a bend) of any channel will be more than 20 degrees, such as e.g. over 30 or 40 or even 50 degrees. In one embodiment the maximum angle of curvature of the channels may be between 20 and 70 degrees. This has the advantage of avoiding sharp bends that may be detrimental to sanitation. The radius of curvature will also vary over the system and optionally the average radius of curvature of any channel will be less than 5 channel diameters (or equivalent circle diameters if the channels are not cylindrical), in certain embodiments less than 4 or even less than 2 diameters. To obtain a smooth curved structure advantageous for sanitation, distribution and low pressure drops, the minimum radius of curvature in the channel system should be above 0.25 channel diameters (or equivalent circle diameters if the channels are not cylindrical), in certain embodiments above 0.5 channel diameters. The channel systems contemplated here will be three-dimensionally tortuous and hence not accessible in their entirety from the outside with machining tools, moulds etc., making them difficult/impossible to produce with traditional methods. As a solution to this issue we have found that Free Form Fabrication can be applied to channel systems that are not readily accessible with machining tools or moulds from the outside of the distributor unit.

In an advantageous embodiment the channel system has two or more generations of branching. To get good distribution, a high degree of branching is needed and this is preferably accomplished by multiple levels of branching. As soon as the number of branch generations exceeds two (i.e. inlet channel 2+first branch generation 5+second branch generation 6), the branch network will contain parts that are not accessible from the outside with machining tools or moulds, but again the free form manufacturing technology makes this type of arrangement possible without having to assemble the unit from several parts. Even two generations of branching is in most cases difficult to achieve by machining from the outside. In one embodiment all branch channels form an acute angle with at least one other branch channel originating from the same branching point. The angle can be below 70 degrees or even below 50 degrees.

In one aspect of the invention, all paths through the channel system, from inlet channel 2 through the branching channels to the outlet side 4, have essentially the same flow resistance. This preferably means that they have essentially the same length, tortuosity and diameters.

In a further embodiment the distributor unit comprises channels with tapered channel segments as illustrated in FIG. 8*a-f*, optionally with the channel diameter decreasing 20,22 from the inlet side of the unit. Previous designs typically use cylindrical channels, because these are easiest to manufacture by machining We have however discovered an advantage in using tapered channels so that the differential pressure drop can be made constant or nearly constant throughout the distributor network, which is advantageous for the column efficiency. This type of design would either involve tapered channels with a diameter that decreases e.g. linearly 20 from the inlet side or more complex geometries with nonlinear diameter changes 22,23 and/or constrictions 24,25 at suitable points. With such designs it is possible to prepare distributor units where the pressure drop during use and testing is either constant or varies in a linear or non-linear mode along the channel system, whichever gives the best column efficiency in a given system. It is also possible to prepare distributor units where the residence time and/or hold-up volume is constant for all paths through the channel system, or alternatively where residence time and/or hold-up volume varies according to a predetermined pattern.

In another embodiment, the channel diameter increases at the outlet side to form a set of conical or pyramidal diffusors 7 (FIGS. 2 and 3). These diffusors will provide the final stage of distribution before the flow reaches the bed surface.

In one embodiment the fluid distributor unit comprises two or more separate channel systems for individual distribution of several fluids to a column. This is particularly useful in solid phase synthesis, where different reactive chemicals are applied to the column and premature reaction with residual fluids in the distributor should be avoided.

Another aspect of the invention is a chromatography or solid phase synthesis column equipped with a fluid distributor unit as described above. As the importance of good distribution increases with increasing column diameter, it is particularly advantageous to use the distributor unit on cylindrical axial flow columns with over 5 cm bed diameter or even over 10, 20, 30 or 40 cm.

Yet another aspect of the invention is a method to prepare a fluid distributor unit by free form fabrication. Free form fabrication (FFF) is a broad term for techniques to manufacture solid objects by the sequential delivery of energy and/or material to specified points in space to produce that solid. A general feature is that a three-dimensional computer model is generated, sliced into thin sections and two-dimensional coordinates are provided for the sections. The two-dimensional coordinates are then used to control the placement of solid material in a layer-by-layer build-up of a solid object according to the computer model. FFF is also referred to as solid free form fabrication (SFF), rapid prototyping, rapid manufacturing, layered manufacturing and additive fabrication. FFF techniques are available for manufacturing of objects from metals, thermoplastics, crosslinked polymers and ceramics. A number of these techniques are:

Electron beam melting. Starts with metal powder and produces fully fused void-free solid metal parts Electron beam free form fabrication. Starts with metal wire and produces fully fused void-free metal parts.

Fused deposition modelling. Extrudes molten plastic through a nozzle, building up a three-dimensional object.

Laminated object manufacturing. Starts with sheets of paper or thermoplastic film, that are attached to previous layers by adhesive bonding or heat-sealing and then the desired outline of the layer is cut by a laser or a knife.

Laser engineered net shaping. Starts with metal powder that is melted by a laser and deposited directly on the part. Produces fully fused void-free parts.

Selective laser sintering. Starts with powdered metal or thermoplastic, which is fused by a laser in the object outline volume.

Shape deposition manufacturing. The part and a sacrificial support material are deposited by a printhead and later machined to near-final shape.

Solid ground curing. A layer of photopolymer is applied and cured with UV light beamed through an electrostatic mask. A solid wax is typically used as sacrificial support material.

Stereolithography. A liquid photopolymerizable composition is deposited and cured with a laser.

Three-dimensional printing. A general terminology for several techniques that use inkjet-like printheads to deposit liquid materials in layers. The liquid "inks" are typically solidified by photopolymerization or thermal phase change.

Robocasting. Another general terminology for techniques where material is deposited by a robotically controlled syringe or extrusion head.

A great advantage of FFF is that objects of essentially any shape can be manufactured. This means that constructions which hitherto have been difficult to prepare, like curved channels, channel systems with multiple branching, tapered channels etc can be manufactured using FFF. A typical FFF system is connected to a computer in such a way that a Computer Aided Design (CAD) file is produced on the computer and sent to the FFF "printer" for automated manufacturing. This gives a possibility to optimize the structure according to hydrodynamic theory and to directly manufacture it without having to consider previous limitations in manufacturing technology. Another advantage of FFF is that the production cost is independent of the design complexity. Hence, a design with multiple branch levels and complex channel geometries can be made to the same cost as a relatively simple design.

Figure 9:
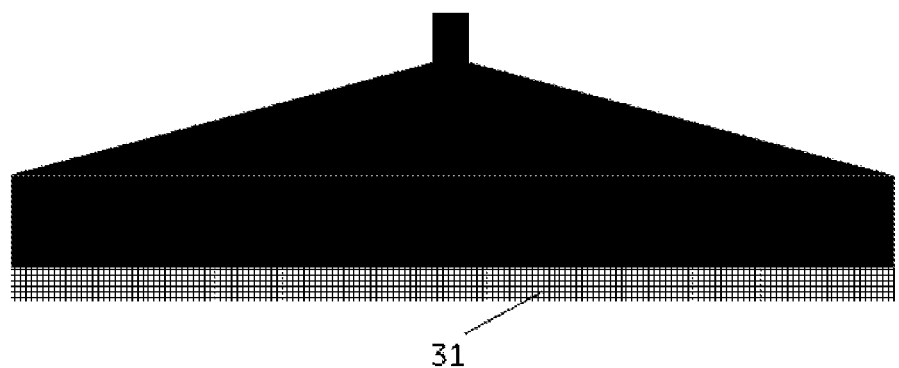
FIG. 9 is a schematic view of a distributor unit with an integral filter according to one embodiment of the invention.

In one aspect of the invention, illustrated in FIG. 9, the distributor unit 30 is directly manufactured as a single body with an integral fine pore filter 31, having average pore diameter below 30 microns or even below 15 microns, using high resolution FFF technology. This eliminates the need to join a separate filter material and hence avoids sanitation difficulties in the joint areas and the risk of filter bulging during testing or use. It also eliminates the need for any support structure between the endpiece and a filter.

In yet another aspect of the invention, dual material FFF technology is used to directly manufacture a distributor unit with an integral elastomeric sealing area against the column material. In this case a rigid material is contemplated for the main body of the distributor unit and an elastomeric material for the sealing area.

One aspect of the invention is a method to design and prepare a fluid distributor unit by communicating a design file from a Computer Assisted Design (CAD) system to a computer-controlled FFF system.

Figure 10:
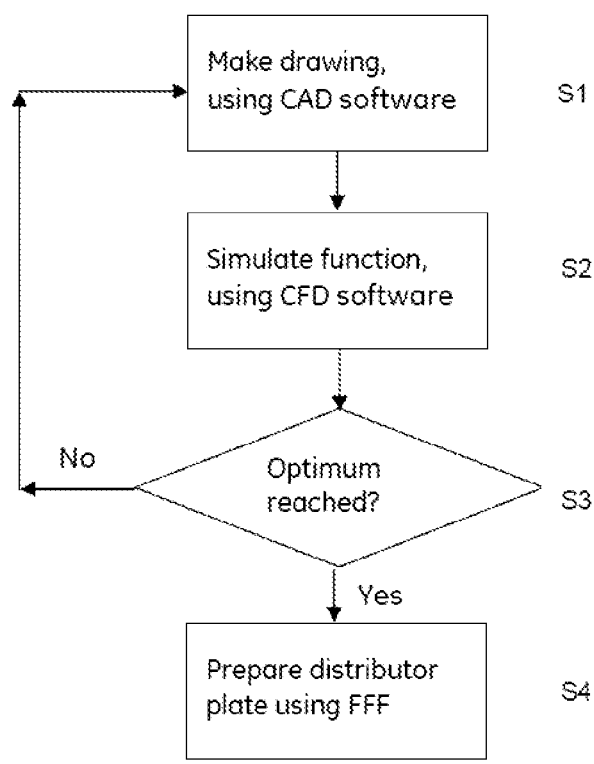
FIG. 10 is a flow scheme of one aspect of the invention, showing a process for drawing, simulating the function, optimizing the function and manufacturing the distributor unit using computer systems.

Suitably, as depicted in FIG. 10, drawings of a distributor unit are S1 made in a computer system (e.g. a CAD system) and the function is then S2 simulated in a computer system, e.g. using some type of Computerized Fluid Dynamics (CFD) software to optimize the design. If the function is not optimal S3 according to the constraints used, a new drawing is S1 prepared and again tested by simulation. When the design is considered optimal S3, the distributor unit is S4 produced in the FFF system. In addition to conventional CFD software it is possible to use any calculation method able to simulate properties of the fluid flow in regard to distribution, residence time, hold-up volume, pressure loss or fluid velocity Suitably, the fluid distributor unit is prepared from a material (crosslinked polymer, thermoplastic, ceramic or metal) generating less than 1 mg/1 leachables in the mobile phase or any other fluid used under running and testing conditions, optionally from a material that does not contain toxic leachables according to the US Pharmacopeia USP VI standard. The amount of leachables is typically tested by filling the unit with an extraction fluid, letting it extract at a set temperature (typically 20-50° C.) for a set time (typically one hour to one week), removing the extraction fluid and determining the concentration of any substance emanating from the distributor unit with analysis methods known in the art. The extraction fluid is suitably chosen among liquids that may be used under running and testing of the columns, such as aqueous solutions of pH 0-14, optionally containing buffer substances, salts, bases, acids, complexing agents or water-miscible solvents.

Suitably, the channel surfaces in the fluid distributor unit are produced to a low roughness, with a roughness average (Ra) lower than 10 microns, 5 microns, 2.5 microns or even lower than 0.5 microns. A low surface roughness will improve the sanitation of the device. As some varieties of FFF may give surfaces with Ra values up to 30-50 microns, an advantageous embodiment includes a step of modifying the channel surfaces after the FFF step. In one embodiment this modification step involves the application of a coating on the channel surfaces. The coating can be applied as a liquid through the channel system, which by design is suitable to distribute a coating liquid evenly, and then solidified to form a smooth sanitable coating layer with low roughness. As examples of suitable coatings can be mentioned crosslinkable oligomers (acrylates, epoxies, polyurethanes, polyethers, polyhydroxy polymers etc), solutions or dispersions of polymers in evaporating solvents (e.g. polyacrylates, polyolefins, styrene copolymers etc) or solutions of metal ions that can be deposited as a metal film by galvanic or electroless plating processes. In addition to the reduction of surface roughness, advantages of applying a coating are that it can reduce fouling (particularly if hydrophilic protein-repellant coatings like polyethylene glycol or polysaccharides are used) and hence improve sanitation or it can reduce or it can eliminate migration of chemical compounds from the bulk material into the fluid during operation (particularly if a high barrier coating such as e.g. a metal film is used).

In another embodiment the step of modifying the channel surfaces can involve abrading the channel surfaces, e.g. by passing a fluid containing abrasive particles through the channels. This will also reduce the surface roughness.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A chromatography column, comprising:
a first distributor unit disposed on a top side of a column bed, wherein the first distributor unit is a single body unit comprising: a curved internal channel system including an inlet channel branching out into a plurality of internal channels forming a first channel tree of an internal three-dimensional tortuous structure starting on an inlet side and ending on an outlet side of the first distributor unit and the first internal channel tree including the plurality of internal channels are disposed in a grid pattern on an inlet surface of a first side of the column bed, wherein the single body includes an integral pore filter, and the integral pore filter comprises a plurality of pores of an average pore diameter below 30 microns and being formed by high resolution free form fabrication technology, wherein surfaces of the curved internal channel system have a roughness average Ra of less than 5 microns;
a second distributor unit is an inversed distributor unit of the first distributor unit and is placed upside down relative to the first distributor unit and connected to the column bed on a bottom side of the column bed and comprising a second internal channel tree including a plurality of internal channels in communication with a column outlet of the chromatography column and having a same grid pattern at an outlet surface of the bottom side of the column bed;
wherein a feed enters the inlet channel placed centrally in the chromatography column and said curved internal channel system of the first distributor unit is configured to distribute a liquid phase plug over the entire inlet surface of the first side of the column bed, and the feed then migrates as a well-defined liquid phase plug through the column bed and to an entire bed outlet surface of the column bed;
wherein the second distributor unit is configured to collect the liquid phase plug from the entire bed outlet surface and concentrate the liquid phase plug via the second internal channel tree formed of the plurality of internal channels to the column outlet of the chromatography column;
wherein the plurality of internal channels of the first distributor unit and the plurality of internal channels of the second distributor unit each include tapered channel segments, wherein a diameter of at least one of the tapered channel segments increases at the outlet side of the channel segment to form a set of conical or pyramidal diffusors, wherein the first internal channel tree and the second internal channel tree are without joints and corners, such that part of internal channel volume is not accessible by a straight line of sight from any channel openings on either side of the first distributor unit and the second distributor unit, wherein a maximum angle of curvature of the internal channels of the plurality of internal channels being between 20 and 70 degrees.

2. The chromatography column of claim 1, wherein the internal curved channel system has two or more generations of branching.

3. The chromatography column of claim 1, wherein the internal curved channel system has a maximum angle of curvature of more than 20 degrees.

4. The chromatography column of claim 1, wherein the internal curved channel system has an average radius of curvature of less than 5 channel diameters and a minimum radius of curvature of above 0.25 channel diameters.

5. The chromatography column of claim 1, wherein the several channels extending from the inlet channel to the outlet side have the same flow resistance to a liquid flow.

6. The chromatography column of claim 1, wherein the first and second distributor units are each constructed from a material that generates less than 1 mg/l leachables in an extraction fluid.

7. The chromatography column of claim 1, wherein a material of construction does not contain toxic leachables according to USP VI standard requirements.

8. The chromatography column of claim 1, which is formed as a single body by layer-by-layer build-up of a solid one-piece unit.

9. The chromatography column of claim 1, which is formed as a single body by a free form fabrication method selected from the group consisting of: electron beam melting, electron beam free from fabrication, fused deposition modelling, laminated object manufacturing, laser engineered net shaping, selective laser sintering, shape deposition manufacturing, solid ground curing, stereo lithography, three-dimensional printing, and robocasting.

10. The chromatography column of claim 1, wherein a feed enters the second distributor unit, passes through the internal curved channel system, and exits from the first distributor unit.

11. A chromatography column, comprising: a first distributor unit having a single inlet at an inlet side, wherein the first distributor unit is disposed on a top side of a column bed and comprising:
a curved internal channel system with an inlet channel branching into a plurality of internal channels forming a first internal channel tree of an internal three-dimensional tortuous structure starting on an inlet side and terminating on an outlet side of the first distributor unit and the first internal channel tree including the plurality of internal channels are disposed in a grid pattern on an inlet surface of a first side of the column bed, wherein surfaces of the curved internal channel system have a roughness average Ra of less than 5 microns;
a second distributor unit being an inversed distributor unit of the first distributor unit and comprising a curved internal channel system corresponding to the curved internal channel system of the first distributor unit and placed upside down relative to the first distributor unit and connected to a second side of the column bed opposite the first side of the column bed and a second internal channel tree including a plurality of internal channels in communication with a column outlet of the chromatography column and having a same grid pattern at an outlet surface of the bottom side of the column bed;
wherein a feed enters the inlet channel placed centrally in the chromatography column and said curved internal channel system of the first distributor unit is configured to distribute a liquid phase plug over the entire inlet surface of the first side of the column bed and the feed then migrates as a well-defined liquid phase plug through the column bed and to an entire bed outlet surface of the column bed;
wherein the curved internal channel system of the second distributor unit is configured to collect the liquid phase plug from the entire bed outlet surface of the column bed and concentrate the liquid phase plug via the second internal channel tree formed of the plurality of internal channels thereof to the column outlet of the chromatography column;

wherein the plurality of internal channels of the first distributor unit and the plurality of internal channels of the second distributor unit each include tapered internal channel segments, wherein a diameter of at least one of the tapered internal channel segments increases at the outlet side of the internal channel segment to form a set of conical or pyramidal diffusors at an end of each of the plurality of internal channels of the first distributor unit and the plurality of internal channels of the second distributor unit, wherein the first internal channel tree and the second internal channel tree are without joints and corners, such that part of an internal channel volume is not accessible by a straight line of sight from any channel openings on either side of the first distributor unit and the second distributor unit, wherein a maximum angle of curvature of the channels of the plurality of channels being between 20 and 70 degrees.

* * * * *